April 18, 1950     F. R. MERRIAM, JR     2,504,564
MOTOR BRUSH MOUNTING

Filed June 12, 1948     2 Sheets—Sheet 1

INVENTOR.
Frank Richard Merriam Jr.
BY Frank M. Slough &
J. H. Slough

April 18, 1950   F. R. MERRIAM, JR   2,504,564
MOTOR BRUSH MOUNTING

Filed June 12, 1948   2 Sheets-Sheet 2

INVENTOR.
Frank Richard Merriam Jr.
BY

Patented Apr. 18, 1950

2,504,564

UNITED STATES PATENT OFFICE 2,504,564

MOTOR BRUSH MOUNTING

Frank Richard Merriam, Jr., Westlake Village, Ohio, assignor to The General Industries Company, Elyria, Ohio, a corporation of Ohio Application June 12, 1948, Serial No. 32,661

6 Claims. (Cl. 171—323)

My invention relates to improvements in motor brush mountings, and more particularly relates to that type of such mountings as are especially adapted for use on the smaller fractional-horse power motors such as are commonly employed to drive automobile heater fans, though not limited thereby.

Among the objects of my invention are to provide brush mountings, for small motors, which are inexpensive, and consisting of few parts, said parts being adapted to be stamped from sheet material.

Other objects, and the nature of the invention, will be readily apparent from the following specification, descriptive of a presently preferred embodiment, which is shown in the accompanying drawings to which reference is made in the drawings, whereof—

Figure 1:
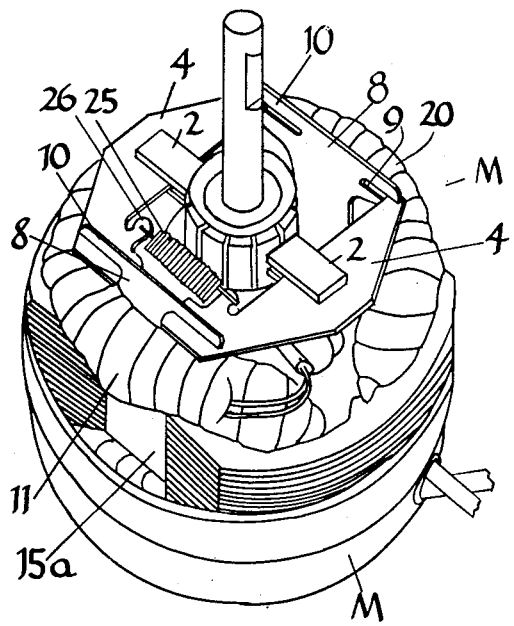
Fig. 1 is a perspective view of a motor, with an uppermost end casing thereof removed, to which my brush mounting is shown as applied.
Figure 2:
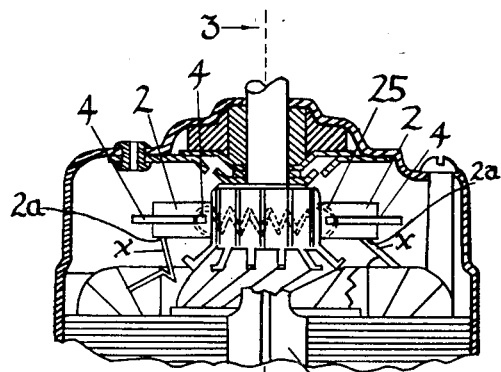
Fig. 2 is a side elevational view of an end portion of the motor, with the relatively enclosing portion of the casing being shown in diametrical section.
Figure 3:
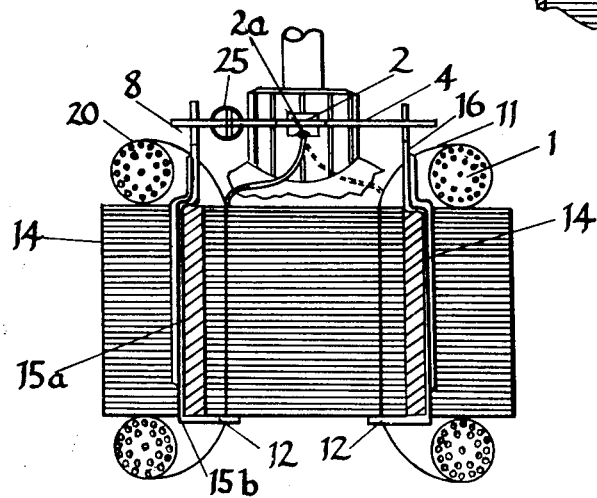

Fig. 3 shows the motor field structure of the motor of Fig. 1, in diametrical section, said view being taken on the plane indicated at 3—3 of Fig. 2, and the view also including a showing in side elevation an end fragment of the motor rotor which comprises the commutator, an end elevational view of one of the two motor brushes, the brush carrier for said brush, and an end view of a spring joining the pair of brush carriers.

Figure 4:
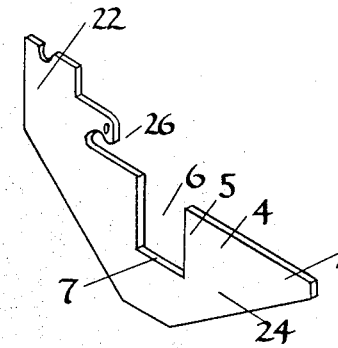

Fig. 4 is a perspective view of one of a pair of like brush carriers.

Figure 5:
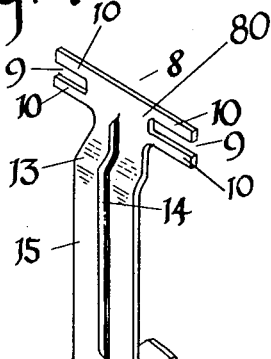

Fig. 5 is a perspective view of one of a pair of anchor strips, each of which are adapted to support corresponding ends of the pair of brush carriers.

Figure 7:
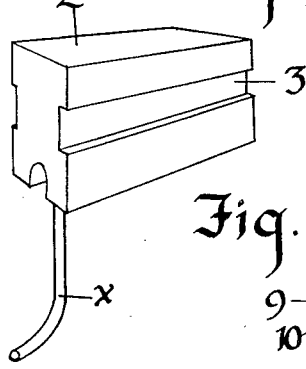

Fig. 7 is a perspective view of one of the pair of like motor brushes.

Figure 8:
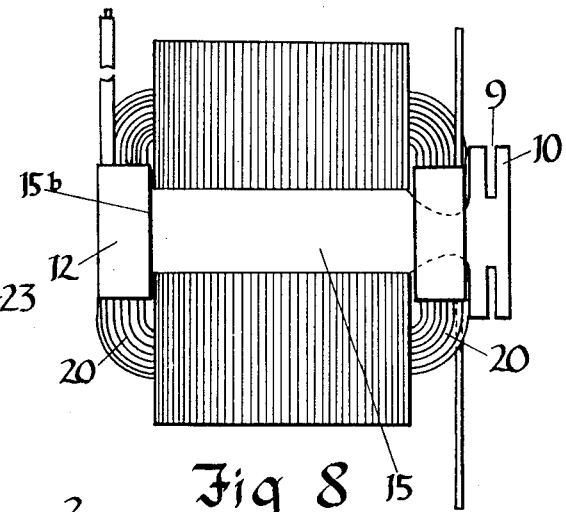
Figure 6:
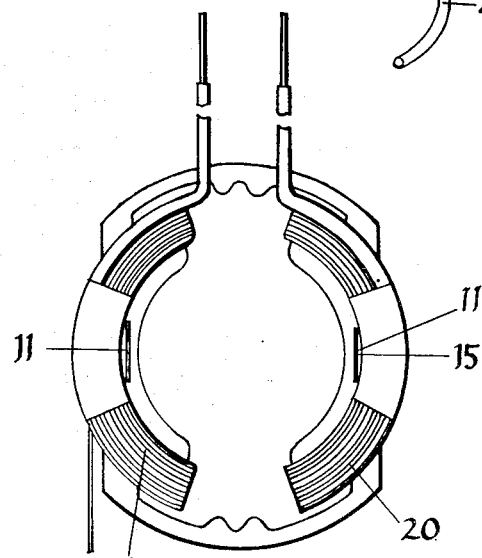

Figs. 6 and 8 are respectively end elevational and side elevational views of the motor stator in which the positioning of the twin anchor strips by which the mounts are secured to the frame of the motor, is indicated.

Referring now to the drawings in all of which, like parts are denoted by like reference characters, the motor is a conventional type, employing a pair of like brushes 2, which as best shown in Fig. 7, are substantially H-shaped in transverse section, whereby longitudinal grooves 3, at their sides, permit the brushes, each to be slidingly fitted onto like brush carriers 4, Fig. 4, the portions 5—5 thereof, which border the side edges of a rectilinear notch 6, being adapted to loosely fit within the brush grooves 3, with the end surface of the brush which is inserted into the notch 6, disposed in engagement with the end wall 7 of the notch. A "pig-tail" connector wire x, is soldered, or otherwise connected, by an end to a convenient lateral surface portion of each brush 2, as at 2a.

The like pair of support strips or posts 8, one of which is shown in Fig. 5, are generally speaking, of T-form, and each comprises a T-bar portion 80, whose ends are bifurcated to provide like oppositely extending notches 9, defined by end forks 10—10; the stems 15 of the strips 8, are each preferably provided with a longitudinal rib 14 to stiffen the strips, said strips terminating in a hook portion 12, said hook being bent from the stem in the same direction as the off-setting bend 13.

The form of the support strips 8 will, of course, be varied for different motor designs, their stems being provided to anchor the so-called T-bar portions to a stationary portion of the motor, and desirably and preferably, but not necessarily, in such a manner that the supports may be secured to a stationary portion of the motor, without requiring the use of bolts or the like, and whereby the strips may, without special tools, be readily and economically installed.

In the present embodiment the T-strip stems 15, before the hooks 12 are formed, are tight-fittingly projected through a convenient passage-way from the commutator side of the motor field to the opposite side thereof, said passage-way including a space within a motor field winding such as 11, Figs. 1, 2, 6 and 8 and emerging at one end, as shown at 15a in Figs. 1 to 3, inclusive, to the outer surface of the field core, then beneath the opposite side of the field winding 11, its end 12 then being re-entrantly bent at 15b, Figs. 5 and 2, to provide the end-flange 12, which is forced against the field core end surface. The other like strip 8 is similarly disposed and anchored, the other field coil 20 overlying corresponding portions of its stem 15.

The anchor strips 16 being in place as described, the T-bar-ends thereof are disposed in relative parallelism, at respectively opposite sides of the commutator 9.

Thereupon the two brush carriers 4, with brushes 2 in the notches 6, are mounted on the T-bars 80 of the strips 8, the corresponding end portions 22, of each of the pair of carriers, being fitted within the notches 9 of oppositely extending bifurcated arms of the one strip, the other ends 24, of each of the pair of carriers 4, being then swung inwardly until the portions 23 of the carriers enter the notches 9 of the arms of the other T-strip 8, and the free ends of the brushes 2 are thus brought into engagement with opposite sides of the commutator, before the portions 23 become deeply disposed in said notches 9.

A tensile spring 25 is expanded to interconnect the hooks 26 of the carriers 4, to ensure that both of the carriers 4 are held with their end portions maintained in the appropriate notches 9 of the T-bar portions of the anchor strips 8, to ensure resiliently maintained contact between the free ends of the brushes and the commutator surface at opposite sides of the commutator.

Having thus described my invention in a single one of many variant embodiments, by way of example, only, I claim as my invention:

1. Brush holder mechanism for direct current motors comprising a pair of T-shaped supporting posts each end of each T-bar being bifurcated and said bars being disposed, in substantial parallelism, at relatively opposite sides of the commutator, and each T-stem being fixedly secured to the motor frame, a pair of brush carriers each having opposite end portions adapted to respectively fit between the slot defined by the forks of one end portion of different of said T-bars, the carriers of said pair being relatively disposed at opposite sides of the commutator in substantial parallelism, and said carriers and T-bars together forming a quadrilateral jointed structure surrounding the commutator, a commutator brush carried by each carrier extending inwardly towards, and interspacing its associated carrier from, said commutator, and spring means yieldably exerting pressure on said carriers to position their ends to such depth within said bar slots as will cause the brushes to pressure-engage said commutator at opposite sides thereof.

2. The brush holder mechanism substantially as set forth in claim 1, characterized by said carriers being substantially thin in at least their end portions which are disposed in the T-bar slots, and the forks being substantially close together to cause the lateral slot edges to loosely embrace said carrier end portions while preventing substantial tilting of the carrier.

3. The mechanism substantially as set forth in claim 1, characterized by said spring means comprising a coiled spring disposed at a side of the commutator and secured in tension by its ends to both said carriers nearest a corresponding end of each carrier.

4. Brush holder mechanism for electric motors of the type having a commutator at one end of a centrally disposed armature and comprising a field structure enclosing a wound portion of the armature, said mechanism comprising a pair of relatively elongated supporting straps each comprising a portion anchored exteriorly to said structure and having an end, said ends disposed in relative parallelism at different opposite sides of the said commutator, a pair of substantially like brush carriers relatively disposed at different opposite sides of the commutator and each carrier having its respective opposite end portions each disposed in relatively interlocked slidable engaged relation with a laterally disposed portion of a different one of said pair of strap ends, whereby said carriers and strap end portions together form a quadrilateral jointed structure surrounding the commutator and wherein each joint between any of said carrier ends and any of said strap ends comprises a projection of the one fitted into a guiding passage of the other, the said passages being of such form and extending in such directions that each said carrier is adapted to be so moved in opposite directions in relatively approaching and receding directions, towards and away from the adjacent sides of the commutator, a brush secured to a medial commutator-facing portion of each said carrier, and spring means adapted to resiliently move said carriers inwardly to effect pressure engagement between said brushes and relatively opposite sides of the commutator.

5. A brush holder mechanism for electric motors of the type having a commutator at one end of a centrally disposed armature and a field structure enclosing a wound portion of the armature, said mechanism comprising a pair of substantially parallel flat supports each rigidly affixed by portions to opposite sides of said structure, and having ends disposed at opposite sides of the commutator in such manner as to define two sides of a quadrilateral structure, a pair of brush carriers each joiningly interfitted by its ends to correspondingly laterally disposed portions of both said strap ends so as to complete the formation of such quadrilateral structure, each corner portion thereof comprising a carrier end and the thereby joined laterally disposed strap end portion and the joint between them being effected by a tongue portion of the one being disposed and slidable in a passage of the other, a commutator brush carried by each said carrier and extending inwardly towards said commutator, and spring means resiliently exerting pressure on said carriers to bias them toward the commutator so as to cause said brushes to pressure-engage said commutator at opposite sides thereof.

6. The combination with a motor of the type having a frame and a commutator, a pair of radially extending brushes respectively engaged by their inner ends with opposite sides of the outer surface of said commutator, a pair of brush supporting carriers each extending transversely of a respectively different one of said carriers, a pair of mounts for said carriers, said mounts being similarly formed with relatively parallel heads, and anchoring stems, and each of said stems respectively extending over radially opposite outer portions of said frame and being secured thereto, said carriers and said mount heads being relatively so disposed as to define a quadrilateral brush supporting frame, having corner portions each of which comprises one of the two opposite lateral end portions of one of said carriers and an adjacent one of the two opposite side portions of one of said mount heads which are co-relatively so formed as to afford cooperative elements of a slidably interlocking joint with said joint comprising one of said elements fitting within and guided by bounding wall portions of a passage afforded by the other element, and said elements adapted to substantially restrain any movement of said carriers except inward and outward movements thereof which are directed toward and from said commutator, and spring means biasing said carriers towards said commutator and adapted to effect and maintain spring-pressed engagement between the inner ends of said brushes and the commutator.

FRANK RICHARD MERRIAM, Jr.

REFERENCES CITED

The following references are of record in the file of this patent:

UNITED STATES PATENTS

| Number | Name | Date |
| --- | --- | --- |
| 1,688,847 | Aufiero | Oct. 23, 1928 |

FOREIGN PATENTS

| Number | Country | Date |
| --- | --- | --- |
| 1,701 | Great Britain | of 1885 |
| 13,624 | Great Britain | of 1904 |